ROBERT LONG.

Improvement in Sheave for Wire-Rope.

No. 126,971.   Patented May 21, 1872.

Witnesses
A. C. Johnston
James J. Johnston

Inventor
Robert Long

UNITED STATES PATENT OFFICE.

ROBERT LONG, OF SCOTT TOWNSHIP, (TEMPERANCEVILLE POST-OFFICE,) PENNSYLVANIA.

IMPROVEMENT IN SHEAVES FOR WIRE-ROPE.

Specification forming part of Letters Patent No. 126,971, dated May 21, 1872.

*To all whom it may concern:*

Be it known that I, ROBERT LONG, of Scott township, (of which Temperanceville is the post-office,) Allegheny county, State of Pennsylvania, have invented a certain new and useful Improvement in Sheave for Wire-Rope; and I do hereby declare that the following is a full, clear, and exact description thereof, reference being had to the accompanying drawing and to the letters of reference marked thereon.

The nature of my invention consists in constructing a sheave with detached flanges, and provided with an elastic bearing or tread for the rope.

To enable others skilled in the art to make and use my invention, I will proceed to describe more fully its construction and operation.

Figure 1:
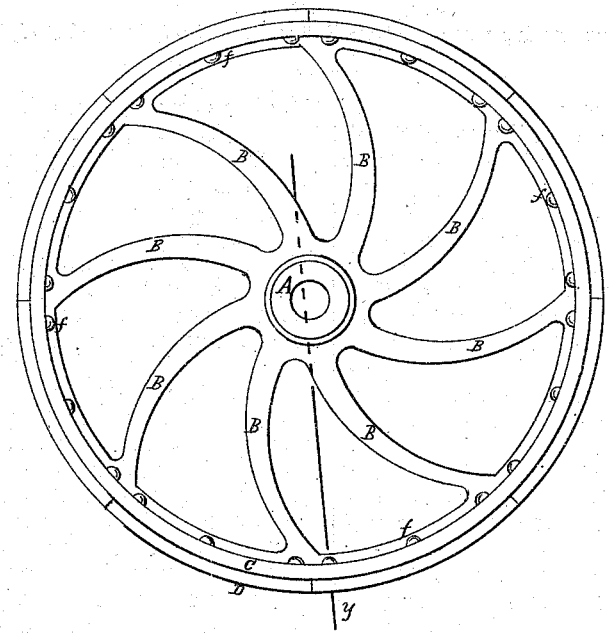
Figure 2:
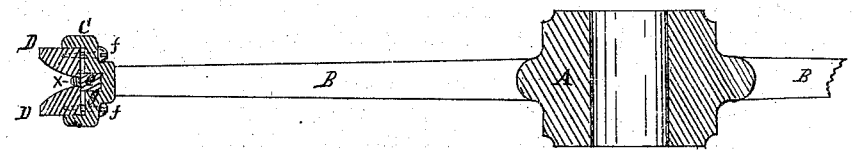

In the accompanying drawing, which forms part of my specification, Figure 1 is a side view of my improvement in sheave for wire-rope. Fig. 2 is a transverse section of the same at line $y$ of Fig. 1.

A represents the hub, from which radiate curved arms B, the outer ends of which are connected to a rim, C, provided with a groove for the flanges D and elastic bearing or tread $e$ for the wire rope X, which is shown in cross-section in Fig. 2. The detached flanges D are made in sections or segments, as shown in Fig. 1, and are secured to the rim C by means of screws or bolts $f$, which pass through the rim C and are screwed into the several sections of the flanges D. The gum bearing or tread $e$ is placed in the groove $g$ prior to securing the flanges D in place; and a portion of the base of the flanges project over the gum bearing or tread, whereby it is held securely in its place.

Sheaves constructed as herein described will relieve the wire-rope from all undue strain, and a greater traction of the rope upon the sheave is obtained, which is a great consideration in the tugging of coal-cars from and to the coal-pit; and by constructing the flange D in sections, so that they may be detached from the rim C, the gum tread $e$ can be permanently secured in the groove $g$; and in case any portion of the flanges D becomes injured or broken, the injured or broken portion can be readily removed and a new part substituted, thereby saving the uninjured portion of the sheave, and the time, trouble, and expense of removing it from its axis or shaft, and the labor of refitting a new sheave upon the axis or shaft.

Having thus described my improvement, what I claim as of my invention is—

The rim, provided with groove $g$, in combination with the gum tread $e$ and detachable flanges D, made in sections, substantially as herein described, and for the purpose set forth.

ROBERT LONG.

Witnesses:
A. C. JOHNSTON,
JAMES J. JOHNSTON.